May 2, 1939.  A. D. SIEDLE  2,156,926

ABSORBER FOR REFRIGERATING SYSTEMS

Filed Feb. 10, 1936

INVENTOR
Arnold D. Siedle
BY
Harry S. Dmarse
ATTORNEY

Patented May 2, 1939

2,156,926

UNITED STATES PATENT OFFICE 2,156,926

ABSORBER FOR REFRIGERATING SYSTEMS

Arnold D. Siedle, Canton, Ohio, assignor to The Hoover Company, North Canton, Ohio, a corporation of Ohio Application February 10, 1936, Serial No. 63,191

8 Claims. (Cl. 261—92)

This invention relates to absorbers for continuous absorption refrigerating systems of the type in which an inert gas is employed and more particularly to means for circulating fluids therein.

This application includes subject matter originally disclosed in application Serial No. 23,628 which was filed on May 27, 1935, as a joint application of Curtis C. Coons and Arnold D. Siedle. Subsequent to the filing of the said application, the subject matter of the present application was removed therefrom and the original application was changed to a sole application of Curtis C. Coons. The present application represents an improvement over the refrigerating system which is disclosed and claimed in an application of Rudolph S. Nelson, Serial No. 45,528, filed October 18, 1935. A modified form of the present invention is also disclosed and claimed in an application of Arnold D. Siedle, Serial No. 63,190, filed February 10, 1936.

It is an object of the present invention to provide improved means for circulating the fluids in the absorber of a continuous absorption refrigerating system.

It is a further object of the invention to provide fluid circulating means, which may be hermetically sealed in an absorber of an absorption refrigerating system, and which in addition to causing both a gas and a liquid to flow in the desired direction, brings the gas and liquid into very intimate contact and splashes or throws them about the inner wall of the absorber so as to enable the heat of absorption to be rapidly discharged. This object is attained in a particularly advantageous manner if a number of eddy currents are set up in both the gas and the liquid passing through the absorber.

It is another object of the invention to provide an absorber for a refrigerating system with power driven means which may be hermetically sealed therein and which causes liquid to flow upwardly through the absorber while contacting with the gas to be absorbed at a number of places.

Other objects reside in certain novel features of the arrangement and construction of parts as will be apparent from the following description taken in connection with the accompanying drawing in which.

Figure 1:
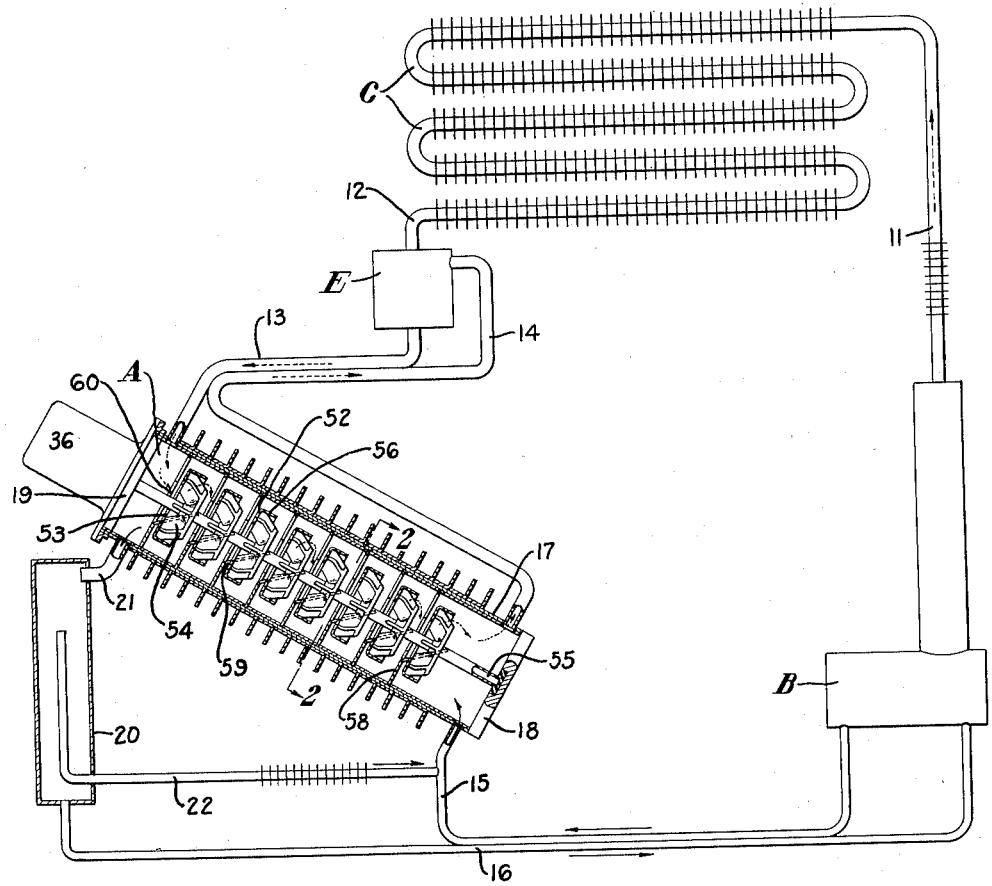
Figure 1 is a diagram illustrating a complete absorption refrigerating system with the absorber thereof shown in vertical cross section and somewhat in detail, the arrangement showing one embodiment of the invention.
Figure 2:
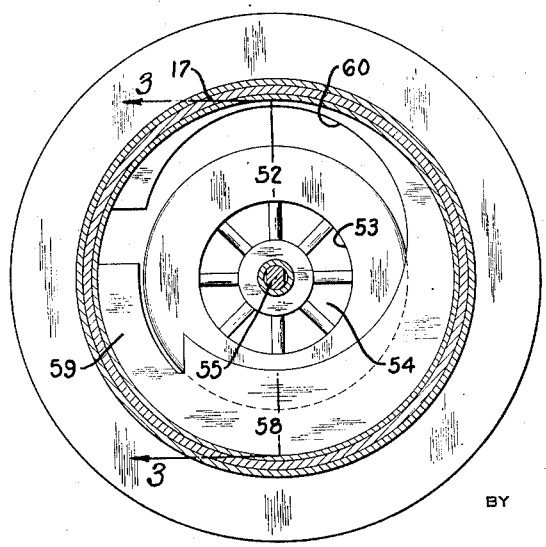
Figure 2 is a transverse cross-sectional view of the absorber illustrated in Figure 1, the view being taken on the line 2—2 thereof.
Figure 3:
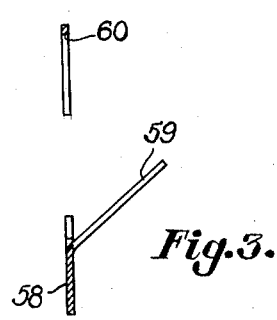
Figure 3 is a fragmentary partial sectional view of a baffle element taken substantially along the line 3—3 of Figure 2 and looking in the direction of the arrows.

Referring to the drawing in detail, it will be seen that a continuous absorption refrigerating system is illustrated as consisting of a boiler B, a condenser C an evaporator E and an absorber A connected together in a more or less conventional manner. The boiler B is connected to the condenser C by means of a conduit 11, a portion of which may act as a rectifier so that when heat is applied to the boiler, refrigerant gas will flow through the pipe 11, condense in the condenser C and be fed into the evaporator E through the conduit 12. The evaporator E is connected to the absorber A by means of two gas conduits 13 and 14 which may be in heat exchange relation and which form a circuit for the flow of inert gas between the evaporator and the absorber as will be explained hereinafter.

The boiler B is connected to the absorber A by means of two liquid conduits 15 and 16 which may be in heat exchange relation.

The main vessel of the absorber A illustrated in Figure 1 consists of a cylinder 17 disposed in an inclined position and provided with end pieces or heads 18 and 19. A small auxiliary vessel 20, which may be regarded as a part of the absorber, is located a slight distance below the main vessel 17 and is connected thereto by a short pipe 21 at its upper end. An additional pipe 22 which extends into the upper portion of the vessel 20 connects it to pipe 15 just below the point where this pipe enters the lower portion of the vessel 17. The conduit 16, mentioned above, is connected to the lower portion of the small auxiliary vessel 20.

By means which will presently be described, absorption liquid is lifted or pumped in the main absorber vessel 17 from a pool formed in the lower end thereof near the point of connection of the conduit 15, upwardly through the vessel and conveyed into the pipe 21. When liquid is so pumped it flows in two cycles, one being from the vessel 17 through the pipe 21, the small auxiliary chamber 20, the conduit 16, the boiler B, the conduit 15 back to the vessel 17 while the other is from the vessel 17 into the vessel 20, through the conduit 21 in which the liquid level is such that a certain amount will overflow into the pipe 22 and be conveyed back through the pipe 15 without going through the boiler B. In order to regulate or maintain the proper flow through the boiler and through the by-pass pipe 22, valves or restrictions (not shown) may be placed in the pipes 16 or 22 if desired, but if the pumping means in the absorber is driven at the proper speed such restrictions will not be necessary since the regulation of flow will be automatic.

As has been indicated above, means is provided for circulating inert gas through the absorber vessel 17, the evaporator E and the conduits 13 and 14. The inert gas may be circulated in either direction. In the arrangement shown, it is caused to flow downwardly in counterflow to the passage of liquid upwardly through the absorber.

It is within the purview of the invention to dispense with the auxiliary vessel 20 and the conduit 22 and connect the pipe 16 directly to the pipe 21, but inasmuch as certain advantages are gained by recirculating the absorption liquid before it returns to the boiler, the use of such a vessel is preferred.

In the arrangement of the present invention, an absorber is illustrated in which rotating means is provided therein for circulating the inert gas, for causing the absorption liquid to move upwardly through the absorber, and for splashing the absorption liquid over the inside of the absorber vessel. The rotating means may be mounted on a shaft 55 in the vessel 17, the shaft being driven by an electric motor 36 sealed to the end plate 19.

The rotating means consists of a number of discs 52 each of which has a central opening 53 therein and a centrifugal fan structure 54 secured thereto. The outer portion of each disc 52 is provided with a downwardly extending flange 56, which in a sense cooperates with the main body of the disc 52 to provide a shroud for the fan 54. Upon rotation of the shaft 55, liquid is thrown off radially and tangentially from the discs 52 and the gas is propelled through the vessel by fans 54.

In the absorber shown baffle plates 58 are provided in the vessel 17, these being disposed at right angles to the shaft 55 upon which the rotating elements 52 are mounted and in parallel with the rotating elements 52. Each plate 58 has a large depending lip 59 struck downwardly therefrom so as to extend alongside and just outside the circle described by the rotating elements. When liquid is taken from the pools formed in the absorber above the baffle plates 58 by the rotating elements and splashed outwardly around the inner wall of the absorber thereby, some of this liquid will fall upon the lips 59. These lips have such an inclination that this liquid will flow into the pool above the baffles with which they are integral. Thus the arrangement provides means for successively lifting the liquid from one pool to the next above it so that the liquid flows upwardly through the absorber.

Aside from the lip 59 which is struck from the body of each baffle plate 58, thus leaving an opening therein, the plate need have only a central opening for the passage of the shaft 55 therethrough. In the preferred arrangement, however, this central opening is made large enough to allow the entire rotor assembly to pass through the baffle plate, and this arrangement is illustrated in the drawing, the opening being shown at 60. This opening is offset upwardly from the center of each baffle plate so that when assembled the rotors dip into the pools of liquid to the proper extent. It is also to be noted that as the inert gas passes downwardly through the absorber vessel, as indicated by the arrows in dash lines, it comes in contact with a spray of liquid off the lower edge of each rotating element.

From the above description it may be obvious that the invention may be carried out in a number of ways. Various other changes not illustrated will be apparent to those skilled in the art without departing from the spirit of the invention or the scope of the annexed claims.

I claim:

1. An absorber adapted for use in a continuous absorption refrigerating system, said absorber consisting of a closed vessel having a number of baffle plates therein arranged in spaced relation, and power driven means sealed therein for circulating absorption liquid therethrough and for bringing gas and liquid therein into intimate contact, said power driven means including motive means and a number of spaced elements mounted for rotation in planes disposed in parallel to the planes in which the baffles are located said baffles having offset means for catching liquid thrown by said elements from a liquid level maintained by one baffle plate to a higher level maintained by another baffle plate, whereby liquid is caused to flow upwardly through said absorber.

2. An absorber adapted for use in a continuous absorption refrigerating system, said absorber consisting of a closed vessel, baffle plates in said vessel disposed in spaced relation and adapted to maintain a number of pools of liquid therein at successively higher elevations, each of said baffle plates having a liquid catching means thereon directed toward an adjacent pool at a lower elevation and power driven means disposed and sealed within said vessel and including a number of rotary members adjacent said baffle plates and disposed to throw liquid upon said catching means, the arrangement being such that said members dip into the pools and as they rotate, cause liquid to flow upwardly through the absorber.

3. An absorber adapted for use in a continuous absorption refrigerating system, said absorber consisting of a closed vessel, baffle plates in said vessel disposed in spaced relation and adapted to maintain a number of pools of liquid therein at successively higher elevations, and power driven means disposed within said vessel and including a number of rotary members adjacent said baffle plates for splashing liquid about the vessel above the levels of the pools, said baffle plates having means depending therefrom for catching some of the liquid thus splashed about, whereby the liquid is caused to travel upwardly through said vessel.

4. An absorber adapted for use in a continuous absorption refrigerating system, said absorber consisting of a closed vessel, baffle plates in said vessel disposed in spaced relation and adapted to maintain a number of pools of liquid therein at successively higher elevations, each baffle plate having a depending lip thereon and power driven means disposed within said vessel and including a number of rotary members adjacent said baffle plates arranged to dip into said pools and throw liquid about the vessel and onto said depending lips so as to cause the liquid to travel upwardly through said vessel, said rotary members comprising flanged discs.

5. An absorber adapted for use in a continuous absorption refrigerating system using inert gas, said absorber consisting of a closed vessel having baffle plates therein, each of said baffle plates having an opening therein, and a laterally extending catch lip adjacent the opening, means for causing inert gas and gas to be absorbed to pass through said openings including rotary members within said vessel for spraying liquid substantially parallel to the baffle plates and onto said lips thereby bringing the liquid and gases into intimate contact and causing the liquid to flow upwardly through the vessel.

6. An absorber adapted for use in an absorption refrigerating system comprising a closed vessel having a plurality of spaced baffle plates therein positioned at successively higher elevations to form a plurality of spaced liquid pools in said vessel at successively higher elevations, means for supplying absorption liquid to a pool at a relatively low elevation in said vessel and for removing absorption liquid from a pool at a relatively high elevation in said vessel, each of said baffles having an opening therein, means for propelling absorption liquid through said vessel and for bringing gas to be absorbed into intimate contact with the absorption liquid, power driven rotary means sealed within said vessel and operative to create sprays of liquid from said pools and to circulate gas to be absorbed through said sprays, air cooling fins mounted on the exterior wall of said vessel, said power driven means being arranged to create sprays which strike the walls of said vessel to transfer heat thereto, and a catch lip on each of said baffles adjacent the opening therein arranged to catch portions of said sprays and to convey the same to an adjacent higher pool.

7. An absorber for absorption refrigerating systems comprising an elongated inclined vessel provided with a plurality of air cooling fins, means for conveying absorption liquid to and from said vessel, a plurality of spaced partitions along the lower side of said vessel forming liquid compartments, each of said partitions being provided with a shelf extending into the compartment below the partition and positioned to drain liquid into the compartment above the partition, means for supplying gas to be absorbed to said vessel, and means including a plurality of rotary elements in said compartments for splashing and spraying the liquid in said pools about the interior of said vessel, through the gas to be absorbed, and onto said shelves, said rotary means including means in each compartment for propelling gas to be absorbed therethrough.

8. An absorber vessel for use in combination with an absorption refrigeration appartus of the type charged with an absorbent medium, a refrigerant dissolvable thereby and a pressure equalizing medium which is inert with respect to both said absorbent and said refrigerant, said absorber comprising an elongated vessel having a plurality of spaced apart baffles therein cooperating with said vessel and with one another to provide a plurality of compartments at successively higher elevations in said vessel, means for propelling the absorption solution through said vessel and for causing the liquid to be brought into intimate contact with a mixture of pressure equalizing medium and refrigerant vapor including power-driven rapidly rotating means within said vessel including means positioned to dip into liquid pools of absorbent medium within said compartments and operable upon rotation to spray said liquid absorbent outwardly and upwardly against the inner side walls of said vessel, means extending outwardly of said baffles toward adjacent lower baffles for collecting a portion of the liquid so sprayed and conducting the same to an adjacent higher compartment, the arrangement being such that the remainder of the liquid flows back into the pool within the compartment from which it has just been sprayed, means for supplying absorbent medium to the lower portion of said vessel and conveying enriched absorbent medium from the upper portion of said vessel, said rapidly rotating means for spraying the absorbent including means for passing pressure equalizing medium containing refrigerant vapor through said vessel and through said spray of absorbent medium whereby said refrigerant is absorbed, and means for transferring the heat of absorption resulting from the absorption of the refrigerant by the absorbent to a cooling medium.

ARNOLD D. SIEDLE.